Figure 1:
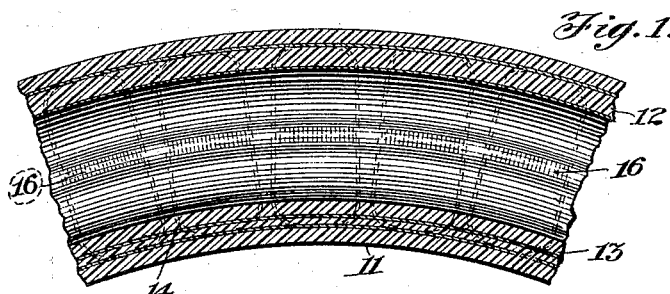

No. 705,768. Patented July 29, 1902.
H. LIEBERTHAL.
WHEEL TIRE.
(Application filed May 5, 1902.)
(No Model.) 2 Sheets—Sheet 1.

Witnesses: Inventor:
Hyman Lieberthal

No. 705,768. Patented July 29, 1902.
H. LIEBERTHAL.
WHEEL TIRE.
(Application filed May 5, 1902.)

(No Model.) 2 Sheets—Sheet 2.

Witnesses:
Ira D. Perry
Julia M. Bristol

Inventor:
Hyman Lieberthal
by Bond, Adams, Pickard & Jackson
Attys

UNITED STATES PATENT OFFICE.

HYMAN LIEBERTHAL, OF CHICAGO, ILLINOIS.

WHEEL-TIRE.

SPECIFICATION forming part of Letters Patent No. 705,768, dated July 29, 1902.

Application filed May 5, 1902. Serial No. 105,964. (No model.)

*To all whom it may concern:*

Be it known that I, HYMAN LIEBERTHAL, a citizen of the United States, residing at Chicago, in the county of Cook and State of Illinois, have invented certain new and useful Improvements in Wheel-Tires, of which the following is a specification, reference being had to the accompanying drawings.

This invention relates to tires designed for use upon the wheels of bicycles and other vehicles and is intended as a substitute for the ordinary pneumatic tire.

The principal object of the invention is to provide a tire possessing the resilient easy-riding qualities of the ordinary makes of pneumatic tire, which object is attained by providing the interior of the tire-tube with a large number of supporting-braces that act to distend the tire and normally keep it in the desired shape, each of said braces being formed so as to readily yield as pressure is applied to the wheel and after the release of the pressure to return to their normal position to again brace the tire-tube. I accomplish this easy yielding of the braces by providing each one with a coiled spring located between the ends of the brace, each of said coiled springs being so located with reference to the tire-tube as to lie opposite the side wall of the tube, substantially midway between the central portion of the tread of the tire and the line of attachment of the tire to the wheel-rim.

Another object of my invention is to provide the tire-tube with opposing internal ribs, one located opposite the line of attachment to the wheel-rim and one opposite the tread of the tire, each of said ribs extending entirely around the tire and each being provided with a bearing-face adapted when the tire is compressed to a great extent to contact with and bear against the corresponding face of the opposite rib, and thereby prevent the tire-tube being compressed to an injurious extent.

I attain these objects by the means shown in the drawings and hereinafter specifically described. That which I regard as new will be set forth in the claims.

Figure 2:
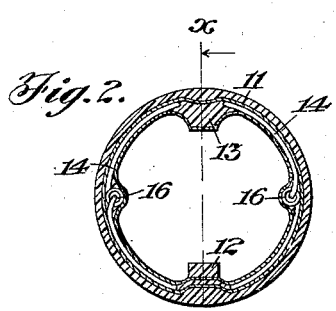
Figure 4:
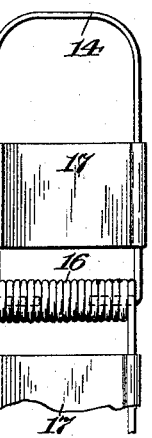
Figure 7:
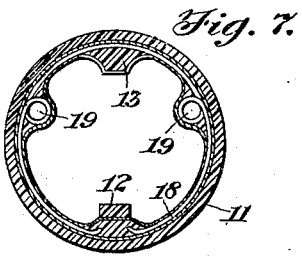
Figure 3:
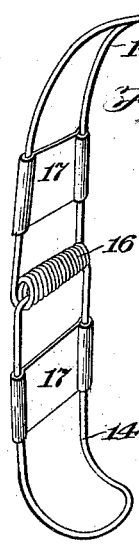
Figure 6:
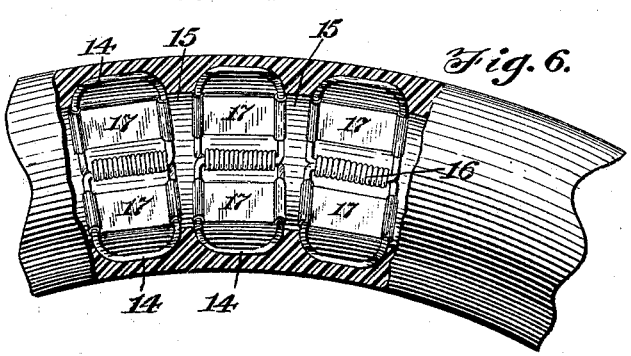
Figures 5, 8:
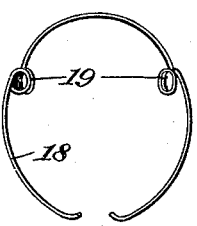
Figure 9:
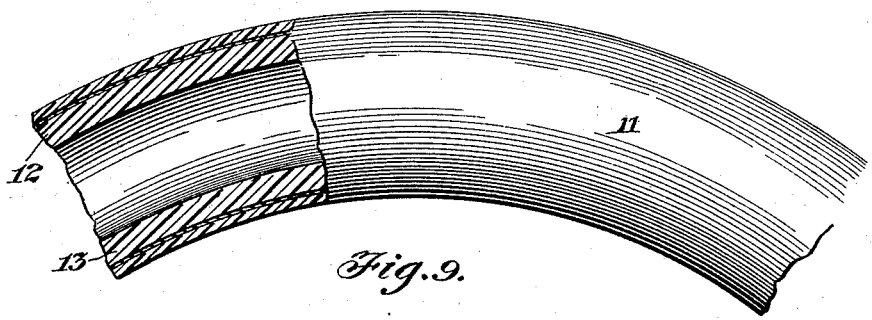
Figure 10:
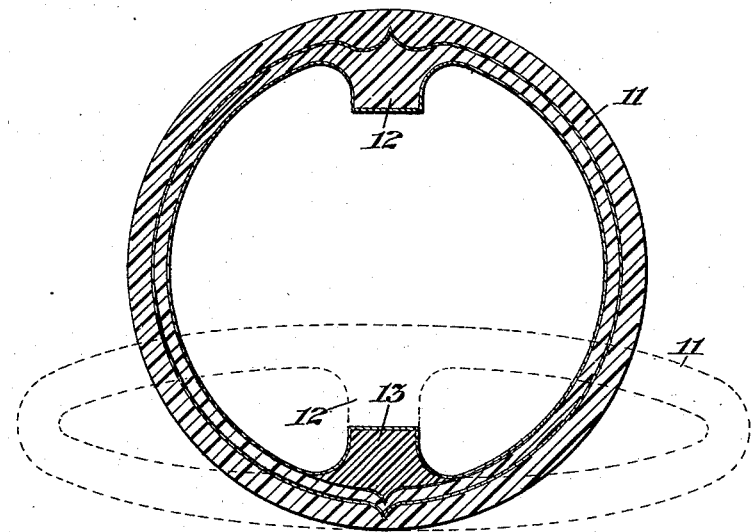

In the accompanying drawings, Figure 1 is a longitudinal section at line *x x* of Fig. 2 through a portion of my improved tire, the yielding braces being indicated by dotted lines. Fig. 2 is a cross-section through the tire. Fig. 3 is a perspective view of one of my improved yielding braces. Fig. 4 is a face view of one of said braces, the lower portion being broken away. Fig. 5 is a side elevation of one of said braces, the lower portion being broken away. Fig. 6 is a side elevation, partly in section and showing the arrangement of the braces when not embedded in the tube. Fig. 7 is a view similar to Fig. 2, but showing a modified form of yielding brace therein. Fig. 8 is a detail showing the form of modified brace represented in the tube of Fig. 7. Fig. 9 is a side elevation, partly in section, of the tube with the opposing internal ribs and unprovided with any yielding braces; and Fig. 10 is an enlarged cross-sectional view of the tube shown in Fig. 9, showing in dotted lines the position assumed by the tire-tube when compressed so as to bring the two internal ribs in contact.

Referring to the several figures of the drawings, 11 indicates a flexible tube, preferably of vulcanized rubber, having formed on its interior and opposite the tread portion of the tube a rib 12, and opposite such rib and lying opposite the point of attachment to the wheel-rim is another rib 13. Both of these ribs extend entirely around the tube, and each, as shown, is formed with a flat bearing-face, so that when the tube is compressed to its limit the bearing-faces of the two ribs 12 and 13 will contact, as indicated by dotted lines in Fig. 10, and by so contacting will hold the tube from being compressed to an injurious extent. It will be understood, of course, that such contacting will not be of common occurrence, but will take place only when an extraordinary weight is applied to the wheel upon which the tire is used.

14 indicates a brace curved to substantially conform to the desired curvature of the tube and of a length to adapt it when laid within the tube to extend substantially from one of the internal ribs to the other. As shown, each side is to be provided with a corresponding brace, and each brace may be embedded in the material of the tube when the same is formed, as indicated by the dotted lines in Fig. 1, or it may be placed against the inner face of the tube, in which case there will be between each two braces a projecting piece of material 15, formed with the tube, as shown in Fig. 6. Each brace is formed in the construction shown of a single piece of wire, which at its central portion is coiled to form a spring 16. The wire from which the brace is made is extended at each end of the spring 16 and formed into a bow, and the ends of the wire are turned to lie within the coiled spring, as indicated by dotted lines in Fig. 4. The side bars of each bowed portion of the brace are united by a band 17, which band helps to hold the bowed portion in place when the brace is subjected to pressure and holds the turned end of such bowed portion within the coiled spring 16, said coiled spring being arranged to lie transversely of the brace, as shown.

It will be understood that both sides of the tire-tube are to be provided with these braces 14, thereby keeping the tire-tube properly distended, and each opposing pair of braces receive together the strain imposed when pressure is applied that would tend to compress the tube.

By constructing the braces in the manner described a joint is provided at the coil 16 that allows the brace to yield sufficiently under pressure, and even when the tire is compressed to a great degree liability of breakage of the parts is obviated by reason of this joint, and immediately upon the release of the pressure on the tube-tire the coiled-spring portion 16 tends to instantly return the loop portions of the brace at each side of the central coiled spring into their proper and normal position.

I am aware that it is not new to provide spring-braces on opposite sides of a longitudinal central line of a tube that is used as a tire; but in such former constructions each brace is formed of a flat metal strip and the liability to breakage under great compressing strains is greater than in the construction herein shown, for by my improved construction the brace yields at the joint formed by the coiled spring 16 upon every application of pressure, and such coiled spring, as before stated, acts to return the brace to its proper position immediately upon the release of such strain.

In Figs. 7 and 8 I have shown a modification in the form of brace. In this modified form a single brace is made to extend across and bear against opposite sides of the inner face of the tube; but even in this construction I preserve the important feature of a coiled spring acting to keep the arms of the brace properly pressed against the face of the tube and acting in the same manner as before described to obviate danger of breakage. This form of brace I have numbered 18, and the coiled springs, one of which is formed at each side of the device, are indicated by 19. In this modification the spring 19 is shown as composed of much fewer coils than the spring 16, and the extending portions of the brace are not bent to form loops. I prefer, if this form be used, to embed it in the material of the tube at the time when said tube is being made; but it of course could be arranged to lie against the inner face of the tube, as in the case of the other construction; but if it were so placed the ribs 12 and 13 would have to be slotted at intervals, as will be readily understood, to allow the braces to be placed in position.

A tubular tire provided with my improved brace will be found to possess the resilient easy-riding qualities of the ordinary pneumatic tire, as the coiled spring between the ends of the brace will be stiff enough to always hold such brace in position to properly distend the tube and at the same time will yield sufficiently to accommodate such ordinary weights as may be applied to the wheel and will always readily yield to enable the wheel to pass over obstructions in the road without annoying jars or jolts, and, as before explained, owing to the coiled-spring feature the brace as a whole is rendered very free from liability to breakage.

That which I claim as my invention, and desire to secure by Letters Patent, is—

1. In a wheel-tire, the combination with a flexible tube, of two series of yielding braces in said tube, each series being located at one side of the longitudinal center of the tube, and a spring for each brace intermediate of its ends, substantially as specified.

2. In a wheel-tire, the combination with a flexible tube, of two series of yielding wire braces in said tube, each of said series being located at one side of the longitudinal center of the tube and each brace having an intermediate coiled-spring portion, the several coils of which lie opposite the side of the tube, means for securing one end of said brace of each series opposite the tread portion of the tire, and means for securing the other end of each brace opposite the portion of the tire adapted to lie against a wheel-rim, substantially as specified.

3. In a wheel-tire, the combination with a flexible tube having oppositely-located internal ribs, of two series of yielding wire braces, each of said series being located in said tube at one side of the longitudinal center thereof, each of said braces having between its ends a coiled-spring portion whose coils lie opposite and against the side of the tube, and each brace extending substantially from one of said ribs to the other, substantially as specified.

4. In a wheel-tire, the combination with a flexible tube, of a series of yielding braces in the tube, each comprising a loop portion at each end and an intermediate spring acting to hold said ends in position, substantially as specified.

5. In a wheel-tire, the combination with a flexible tube, of a series of yielding braces in the tube, each composed of a single wire bent on itself to form a loop portion at each end and an intermediate coiled-spring portion, substantially as specified.

6. In a wheel-tire, the combination with a flexible tube, of a series of yielding braces in the tube, each composed of a single wire bent on itself to form a loop portion at each end and an intermediate coiled-spring portion, and means for uniting the sides of each loop portion, substantially as specified.

7. In a wheel-tire, the combination with a flexible tube, of a series of yielding braces in the tube, each composed of a single wire bent on itself to form a loop portion at each end and an intermediate coil-spring portion, the ends of the wire being bent and inserted within the intermediate spring portion, substantially as specified.

HYMAN LIEBERTHAL.

Witnesses:
ALBERT H. ADAMS,
HELEN M. COLLIN.